(12) United States Patent
Chen et al.

(10) Patent No.: US 9,231,514 B2
(45) Date of Patent: Jan. 5, 2016

(54) MOTOR CONTROL APPARATUS AND MOTOR CONTROL METHOD

(71) Applicant: KABUSHIKI KAISHA YASKAWA DENKI, Kitakyushu (JP)

(72) Inventors: Zhenning Chen, Kitakyushu (JP); Tomohiro Kawachi, Kitakyushu (JP); Kenji Tomohara, Kitakyushu (JP); Koji Higashikawa, Kitakyushu (JP); Masashi Takenouchi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 350 days.

(21) Appl. No.: 13/895,361

(22) Filed: May 16, 2013

(65) Prior Publication Data
US 2014/0197771 A1    Jul. 17, 2014

(30) Foreign Application Priority Data

Jan. 17, 2013 (JP) .................. 2013-006767

(51) Int. Cl.
*H02P 25/18* (2006.01)
*H02P 21/00* (2006.01)

(52) U.S. Cl.
CPC ............ *H02P 25/18* (2013.01); *H02P 21/0089* (2013.01)

(58) Field of Classification Search
CPC ........................................ H02P 25/18
USPC .............. 318/95, 400.41, 494–499, 538, 704, 318/773
See application file for complete search history.

(56) References Cited

U.S. PATENT DOCUMENTS 4,090,119 A * 5/1978 Griffith et al. ................. 318/432
4,413,218 A * 11/1983 Taylor et al. .................. 318/771

FOREIGN PATENT DOCUMENTS

| JP | 2009-216324 | 9/2009 |
| JP | 2010-022165 | 1/2010 |
| JP | 2010-206925 | 9/2010 |

OTHER PUBLICATIONS

Japanese Office Action for corresponding JP Application No. 2013-006767, Jul. 30, 2013 (w/ Partial English Translation).

* cited by examiner

*Primary Examiner* — Bentsu Ro
(74) *Attorney, Agent, or Firm* — Mori & Ward, LLP

(57) ABSTRACT

A winding switching signal generator is configured to obtain information indicating a degree of field weakening from at least one of a current command calculator and a constant output controller, and to generate a winding switching signal for switching from a low speed rotation state to a high speed rotation state when the degree of the field weakening exceeds a predetermined condition in the low speed rotation state.

15 Claims, 9 Drawing Sheets

MOTOR CONTROL APPARATUS AND MOTOR CONTROL METHOD

INCORPORATION BY REFERENCE

The present disclosure contains subject matter related to that disclosed in Japanese Priority Patent Application JP2013-006767 filed in the Japan Patent Office on Jan. 17, 2013, the entire contents of which are hereby incorporated by reference.

BACKGROUND OF THE INVENTION

1. Field of the Invention

The embodiments disclosed herein relates to a motor control apparatus and a motor control method.

2. Description of the Related Art

Heretofore, as to an AC motor, there is known a winding switching technology for switching between a low speed rotation state in which power is supplied to a coil for low speed rotation having a relatively large winding number and a highspeed rotation state in which power is supplied to a coil for high speed rotation having a relatively small winding number.

Japanese Patent Application Laid-open No. 2010-206925 describes switching to the high speed rotation state or to the low speed rotation state when the rotation speed of the AC motor exceeds or falls below a predetermined threshold value.

SUMMARY OF THE INVENTION

According to an exemplary embodiment, there is provided a motor control apparatus, the motor control apparatus including: a d-axis current command value corrector configured to decrease a d-axis current command value as a command value of an exciting current component of a current flowing in an AC motor to perform field weakening; a field weakening information obtaining section configured to obtain information indicating a degree of the field weakening; and a switch command generator configured to generate a switch command from a first state to a second state when the degree of the field weakening exceeds a predetermined condition in the first state, in the first state power is supplied to a coil of a first winding number arranged in the AC motor, and in the second state power is supplied to a coil of a second winding number that is smaller than the first winding number.

Further, according to an exemplary embodiment, there is provided a motor control method, the motor control method including: decreasing a d-axis current command value as a command value of an exciting current component of a current flowing in an AC motor to perform field weakening; obtaining information indicating a degree of the field weakening; and generating a switch command from a first state to a second state when the degree of the field weakening exceeds a predetermined condition in the first state, in the first state power is supplied to a coil of a first winding number arranged in the AC motor, and in the second state power is supplied to a coil of a second winding number that is smaller than the first winding number.

DESCRIPTION OF THE EMBODIMENTS

A motor control apparatus and a motor control method according to an embodiment are described with reference to the drawings.

Figure 1:
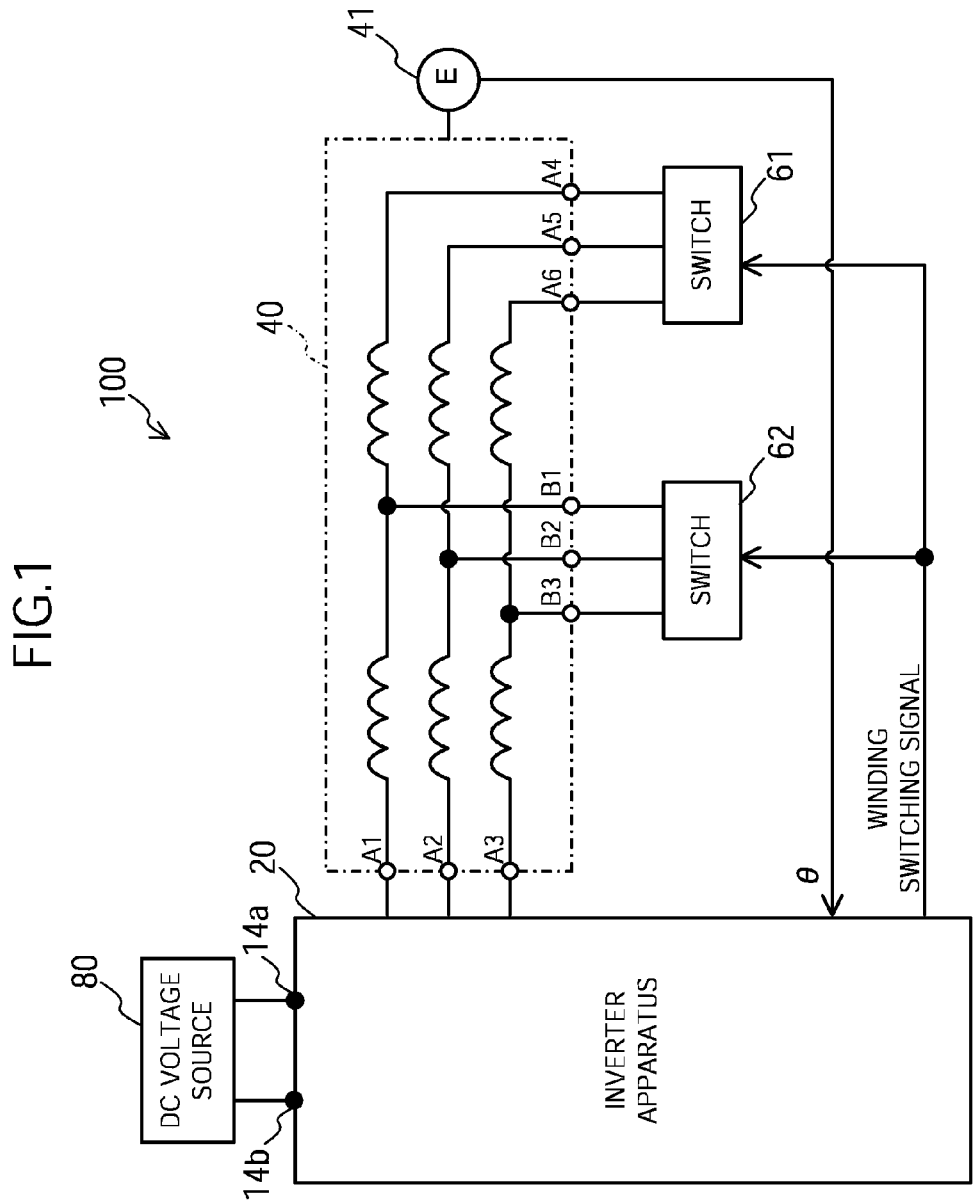
FIG. 1 is a block diagram illustrating a structural example of a drive system.

FIG. 1 is a block diagram illustrating a structural example of a drive system 100. The drive system 100 includes an inverter apparatus 20, an AC motor 40, a position detector 41, first and second switches 61 and 62, and a DC voltage source 80.

The inverter apparatus 20 is an example of the motor control apparatus, which converts DC power supplied from the DC voltage source 80 into three-phase AC power and outputs the converted power to the AC motor 40. Output terminals of the inverter apparatus 20 are connected to connection terminals A1 to A3 arranged at one ends of coils of respective phases of the AC motor 40. A specific structure of the inverter apparatus 20 is described later with reference to FIG. 3.

The AC motor 40 is a three-phase AC motor including U-phase, V-phase, and W-phase coils as three-phase coils, and is rotated by the three-phase AC power supplied from the inverter apparatus 20. The other ends of the respective phase coils of the AC motor 40 are equipped with connection terminals A4 to A6, which are connected to the first switch 61. In addition, midpoints of the respective phase coils of the AC motor 40 are equipped with connection terminals B1 to B3, which are connected to the second switch 62.

The position detector 41 detects a rotation phase θ of a rotor of the AC motor 40 and outputs the result to the inverter apparatus 20. As the position detector 41, an encoder, a resolver, or the like is used.

The DC voltage source 80 is connected to input terminals 14a and 14b of the inverter apparatus 20 so as to supply the DC power to the inverter apparatus 20. The DC voltage source 80 may be, for example, a power supply apparatus including an AC power supply and a rectifier circuit or may be a power supply apparatus such as a battery without a rectifier circuit.

Figure 2:
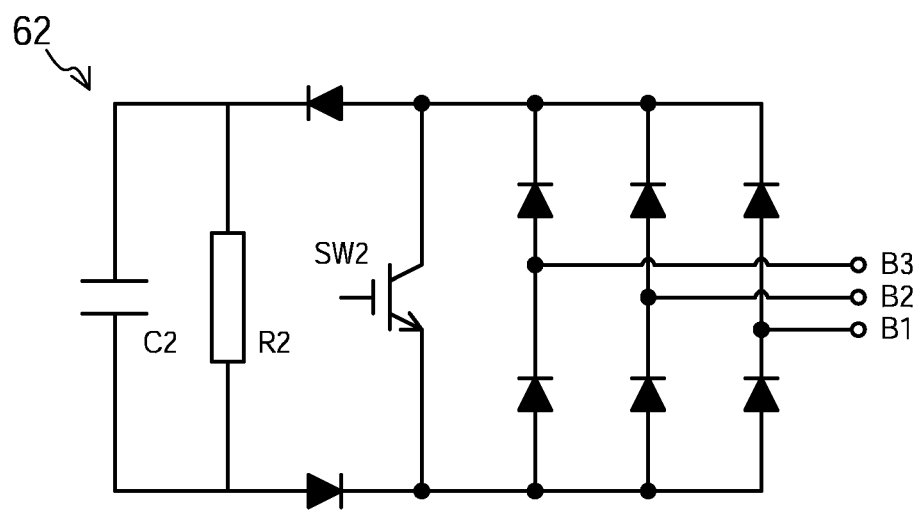
FIG. 2 is a circuit diagram illustrating a structural example of first and second switches.
Figure 2:
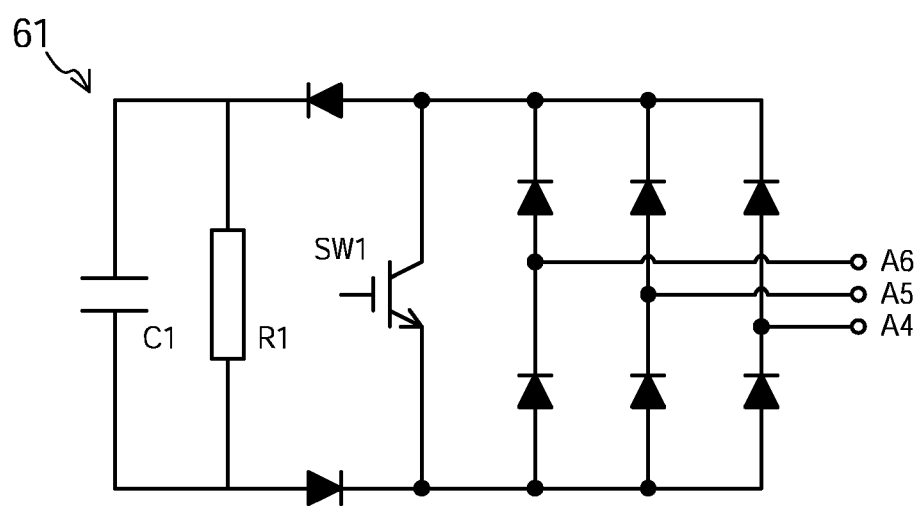

The first and second switches 61 and 62 switch the connection of the respective phase coils of the AC motor 40 on the basis of a winding switching signal output from the inverter apparatus 20, so as to switch output characteristics of the AC motor 40. FIG. 2 is a circuit diagram illustrating a structural example of the first and second switches 61 and 62.

Specifically, if a switch SW1 of the first switch 61 is turned on and a switch SW2 of the second switch 62 is turned off, the connection terminals A4 to A6 arranged at the other ends of the respective phase coils of the AC motor 40 are short-circuited. In this case, because the coil to which the power is supplied has a relatively large winding number, the impedance thereof is relatively high. The state in this case is referred to as "low speed rotation state (first state)". When operating in the low speed rotation state, high torque can be obtained with high efficiency in the low speed rotation region. However, in the high speed rotation region, an output voltage of the inverter apparatus 20 enters a saturation region in which the output voltage is limited by the power supply voltage from the DC voltage source 80. Therefore, it is difficult to ensure torque (see a low speed rotation state S1 in FIG. 8).

In contrast, if the switch SW1 of the first switch 61 is turned off and the switch SW2 of the second switch 62 is turned on, the connection terminals B1 to B3 arranged at midpoints of the respective phase coils of the AC motor 40 are short-circuited. In this case, because the coil to which the power is supplied has a relatively small winding number, the impedance thereof is relatively low. The state in this case is referred to as "high speed rotation state (second state)". When operating in the high speed rotation state, high torque cannot be obtained with high efficiency in the low speed rotation region. However, in the high speed rotation region, because the above-mentioned saturation hardly occurs, it is easy to secure the torque (see a high speed rotation state S2 in FIG. 8).

(Inverter Apparatus)

Figure 3:
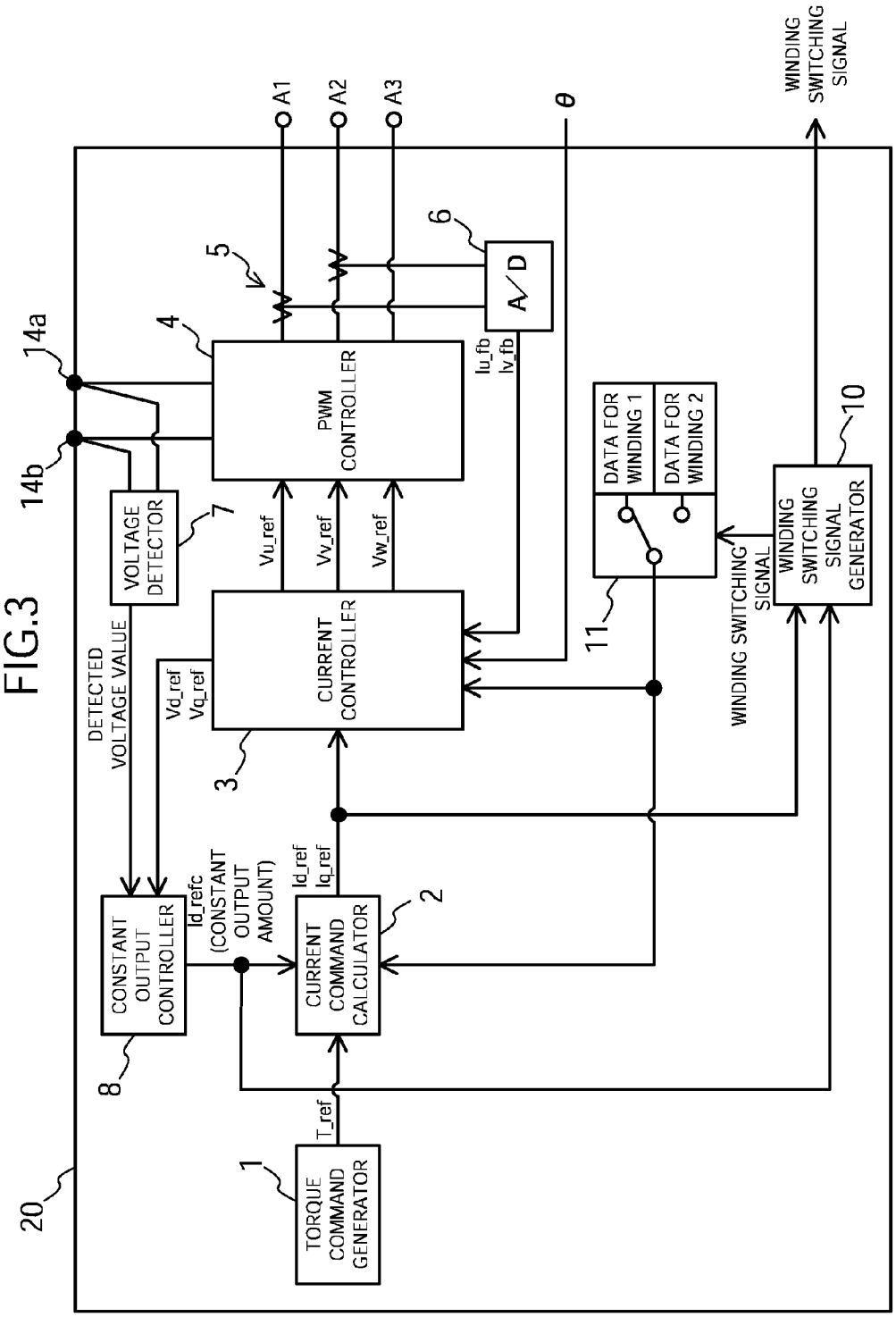
FIG. 3 is a block diagram illustrating a structural example of an inverter apparatus.

FIG. 3 is a block diagram illustrating a structural example of the inverter apparatus 20. The inverter apparatus 20 includes a torque command generator 1, a current command calculator 2, a current controller 3, a PWM controller 4, a current detector 5, an A/D converter 6, a voltage detector 7, a constant output controller 8, a winding switching signal generator 10, and a constant switch 11.

The torque command generator 1 generates a torque command T_ref as a target value of a torque amount generated by the AC motor 40 and outputs the torque command T_ref to the current command calculator 2. The torque command T_ref maybe supplied to the inverter apparatus 20 from an external apparatus.

The current command calculator 2 generates a q-axis current command Iq_ref and a d-axis current command Id_ref on the basis of the torque command T_ref from the torque command generator 1, a constant output amount Id_refc from the constant output controller 8, and various parameters from the constant switch 11. The q-axis current command Iq_ref is a command value of a torque current component (q-axis component) of the current flowing in the AC motor 40, and the d-axis current command Id_ref is a command value of an exciting current component (d-axis component) of the current flowing in the AC motor 40. The current command calculator 2 outputs the generated q-axis current command Iq_ref and d-axis current command Id_ref to the current controller 3 and the winding switching signal generator 10. A specific structure of the current command calculator 2 is described later with reference to FIG. 4.

The current controller 3 generates a q-axis voltage command Vq_ref and a d-axis voltage command Vd_ref on the basis of the q-axis current command Iq_ref and the d-axis current command Id_ref from the current command calculator 2 and outputs the generated q-axis voltage command Vq_ref and d-axis voltage command Vd_ref to the constant output controller 8. The q-axis voltage command Vq_ref is a command value of a torque voltage component (q-axis component) of the voltage applied to the AC motor 40, and the d-axis voltage command Vd_ref is a command value of an exciting voltage component (d-axis component) of the voltage applied to the AC motor 40. Further, the current controller 3 converts the generated q-axis voltage command Vq_ref and d-axis voltage command Vd_ref into U, V, and W phase voltage commands Vu_ref, Vv_ref, and Vw_ref, and outputs the converted voltage commands to the PWM controller 4. A specific structure of the current controller 3 is described later with reference to FIG. 5.

The PWM controller 4 includes a three-phase bridge circuit, and performs pulse width modulation control (PWM control) on the basis of the U, V, and W phase voltage commands Vu_ref, Vv_ref, and Vw _ref from the current controller 3, so as to convert the DC power from the DC voltage source 80 into the three-phase AC power, and outputs the converted three-phase AC power to the AC motor 40.

The current detector 5 detects a current amount flowing in the AC motor 40 and outputs the result to the A/D converter 6. The A/D converter 6 converts the current amount detected by the current detector 5 into a digital signal and outputs the result as detected current values Iu_fb and Iv_fb to the current controller 3.

The voltage detector 7 detects an output voltage of the DC voltage source 80, namely, a voltage applied between the pair of input terminals 14a and 14b of the inverter apparatus 20, converts the detected voltage into a digital signal, and outputs the result as a detected voltage value to the constant output controller 8.

The constant output controller 8 is an example of a constant output amount calculator, and generates the constant output amount Id_refc to be supplied to the current command calculator 2 so as to control field weakening. The constant output amount Id_refc indicates an amount of decreasing the d-axis current command Id_ref generated by the current command calculator 2 from a reference value and is calculated as a negative value, for example. Specifically, the constant output controller 8 calculates the constant output amount Id_refc on the basis of the q-axis voltage command Vq_ref and the d-axis voltage command Vd_ref from the current controller 3 and the detected voltage value from the voltage detector 7, and outputs the result to the current command calculator 2. A specific structure of the constant output controller 8 is described later with reference to FIG. 6.

The winding switching signal generator 10 is an example of a field weakening information obtaining section and a switch command generator. The winding switching signal generator 10 determines whether or not to switch between the low speed rotation state and the high speed rotation state on the basis of the q-axis current command Iq_ref and the d-axis current command Id_ref from the current command calculator 2 and the constant output amount Id_refc from the constant output controller 8, and outputs the winding switching signal for switching (an example of a switch command) to the first and second switches 61 and 62 (see FIG. 1) and the constant switch 11. A specific determining method for switching between the low speed rotation state and the high speed rotation state is described later.

The constant switch 11 holds parameters for the low speed rotation state and parameters for the high speed rotation state as data, and outputs parameters selected by the winding switching signal from the winding switching signal generator 10 to the current command calculator 2 and the current controller 3. Thus, the parameters corresponding to a state of the AC motor 40 are supplied to individual sections. As the parameters held by the constant switch 11, for example, there are a torque-current conversion factor (K), a current phase ($\beta$), armature winding inductance values (Ld and Lq), an armature flux linkage ($\Phi$), and an armature winding resistance (R).

(Current Command Calculator)

Figure 4:
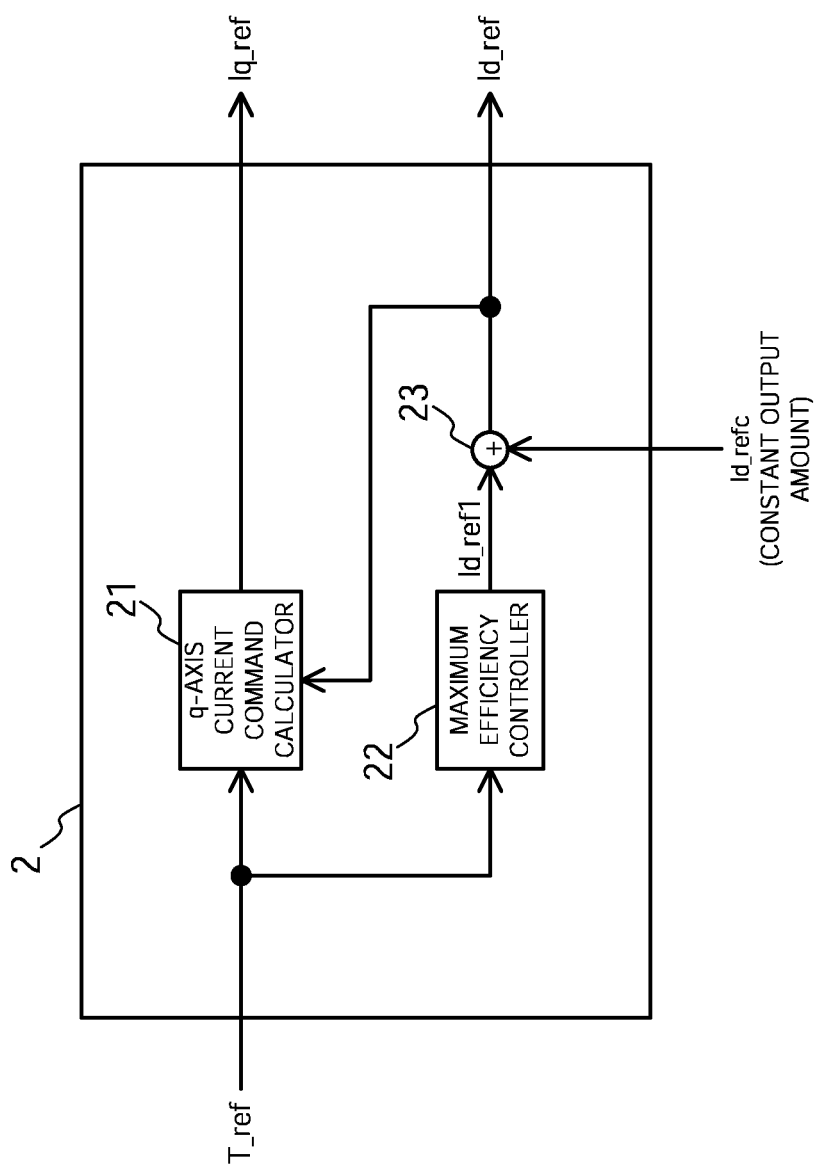
FIG. 4 is a block diagram illustrating a structural example of a current command calculator.

FIG. 4 is a block diagram illustrating a structural example of the current command calculator 2. The current command calculator 2 includes a q-axis current command calculator 21, a maximum efficiency controller 22, and an adder 23.

The q-axis current command calculator 21 calculates the q-axis current command Iq_ref on the basis of the torque command T_ref from the torque command generator 1 (see FIG. 3) and the d-axis current command Id_ref from the adder 23, and outputs the result to the current controller 3 (see FIG.

3). For instance, the q-axis current command calculator 21 calculates the q-axis current command Iq_ref on the basis of parameters of the armature flux linkage Φ, the d-axis armature winding inductance value Ld, and the q-axis armature winding inductance value Lq supplied from the constant switch 11.

The maximum efficiency controller 22 calculates a reference value Id_ref1 of the d-axis current command on the basis of the torque command T_ref from the torque command generator 1 (see FIG. 3), and outputs the result to the adder 23. For instance, the maximum efficiency controller 22 calculates the reference value Id_ref1 of the d-axis current command on the basis of parameters of the torque-current conversion factor K and the current phase β with reference to a q-axis direction supplied from the constant switch 11.

The adder 23 is an example of a d-axis current command value corrector. The adder 23 adds the constant output amount Id_refc from the constant output controller 8 to the reference value Id_ref1 of the d-axis current command from the maximum efficiency controller 22, and outputs the added result as the d-axis current command Id_ref to the current controller 3 (see FIG. 3) and the q-axis current command calculator 21.

Figure 7:
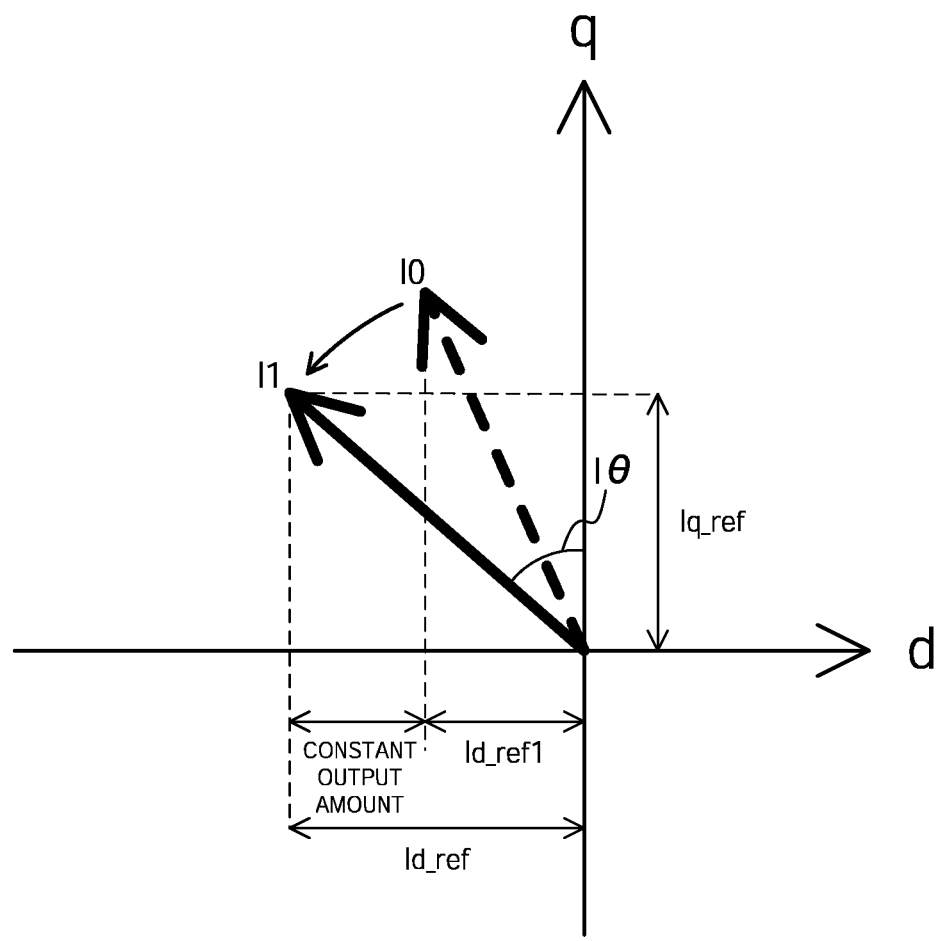
FIG. 7 is a graph for describing field weakening.

In this way, the constant output amount Id_refc (negative value) is added to the reference value Id_ref1 of the d-axis current command, and hence the field weakening is realized. The calculation for field weakening by the adder 23 is described with reference to the vector diagram of FIG. 7. In FIG. 7, arrows of the q-axis and the d-axis indicate a positive direction. In addition, a broken-line arrow indicates a combined vector I0 before the addition, and a solid-line arrow indicates a combined vector I1 after the addition.

The reference value Id_ref1 of the d-axis current command output from the maximum efficiency controller 22 to the adder 23 is calculated so that output efficiency of the AC motor 40 is maximized. The reference value Id_ref1 of the d-axis current command is a value to be the d-axis current command when the field weakening is not performed. In this example, the reference value Id_ref1 of the d-axis current command is a negative value having a relatively small absolute value, and the combined vector I0 before the addition is slightly inclined from the q-axis to the d-axis in the negative direction.

When the adder 23 adds the constant output amount Id_refc to the reference value Id_ref1 of the d-axis current command so that the d-axis current command Id_ref is decreased, the inclination I0 of the combined vector I1 after the addition from the q-axis to the d-axis in the negative direction becomes larger than that of the combined vector I0 before the addition. In this case, the q-axis component of the combined vector I1 is the q-axis current command Iq_ref, and the d-axis component thereof is the d-axis current command Id_ref.

(Current Controller)

Figure 5:
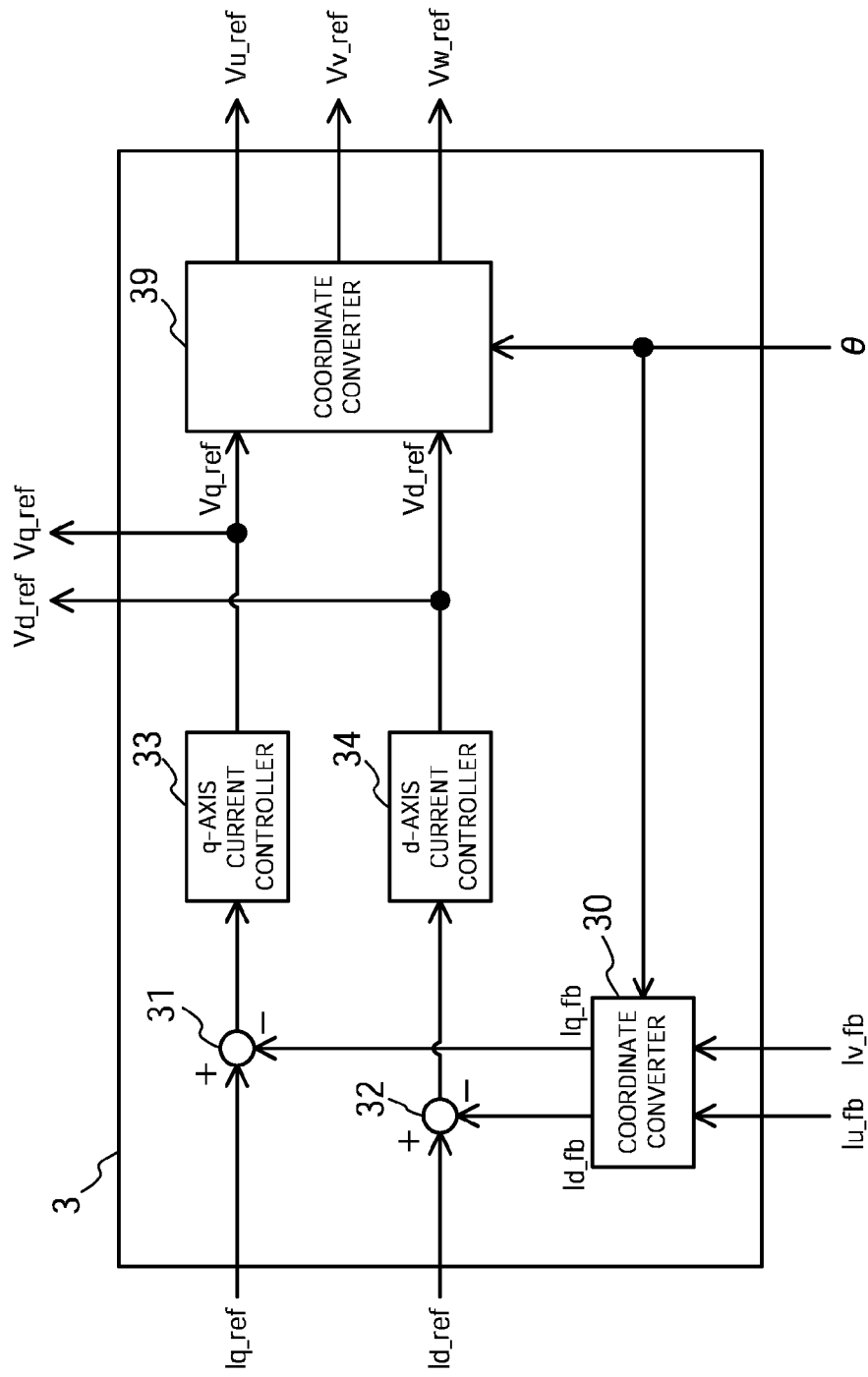
FIG. 5 is a block diagram illustrating a structural example of a current controller.

FIG. 5 is a block diagram illustrating a structural example of the current controller 3. The current controller 3 includes a coordinate converter 30, subtractors 31 and 32, a q-axis current controller 33, a d-axis current controller 34, and a coordinate converter 39.

The coordinate converter 30 performs dq conversion of the detected current values Iu_fb and Iv_fb from the A/D converter 6 on the basis of the rotation phase θ so as to generate a q-axis current feedback value Iq_fb and a d-axis current feedback value Id_fb, and outputs the result to the subtractors 31 and 32.

The subtractor 31 subtracts the q-axis current feedback value Iq_fb from the q-axis current command Iq_ref from the current command calculator 2 (see FIG. 3), and outputs the subtracted result to the q-axis current controller 33. In addition, the subtractor 32 subtracts the d-axis current feedback value Id_fb from the d-axis current command Id_ref from the current command calculator 2 (see FIG. 3), and outputs the subtracted result to the d-axis current controller 34.

The q-axis current controller 33 generates an output value such that the subtracted result output from the subtractor 31, namely, the value obtained by subtracting the q-axis current feedback value Iq_fb from the q-axis current command Iq_ref becomes closer to zero, and outputs the output value as the q-axis voltage command Vq_ref to the coordinate converter 39 and the constant output controller 8 (see FIG. 3). In addition, the d-axis current controller 34 generates an output value such that the subtracted result output from the subtractor 32, namely, the value obtained by subtracting the d-axis current feedback value Id_fb from the d-axis current command Id_ref becomes closer to zero, and outputs the output value as the d-axis voltage command Vd_ref to the coordinate converter 39 and the constant output controller 8 (see FIG. 3).

The coordinate converter 39 performs UVW conversion of the q-axis voltage command Vq_ref and the d-axis voltage command Vd_ref from the q-axis current controller 33 and the d-axis current controller 34 on the basis of the rotation phase θ so as to generate the U, V, and W phase voltage commands Vu_ref, Vv_ref, and Vw_ref, and outputs the generated voltage commands to the PWM controller 4 (see FIG. 3).

(Constant Output Controller)

Figure 6:
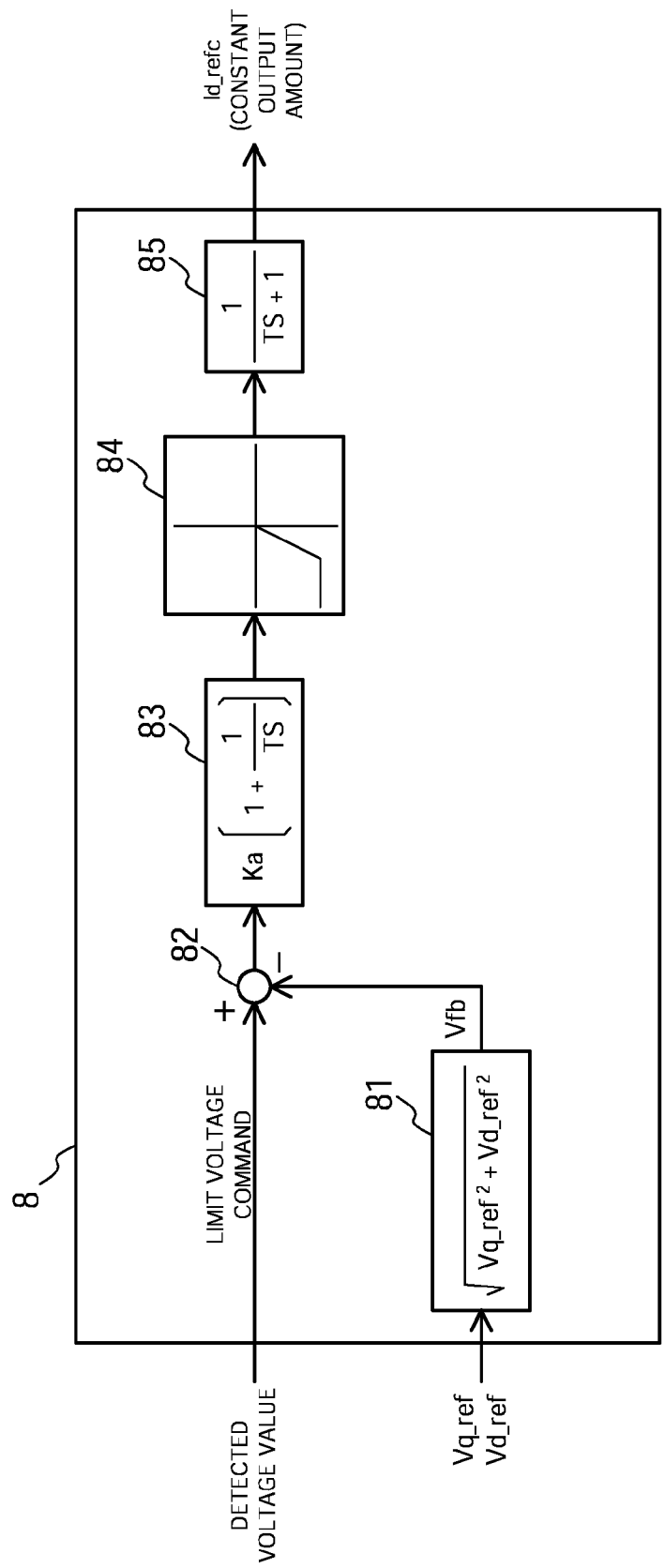
FIG. 6 is a block diagram illustrating a structural example of a constant output controller.

FIG. 6 is a block diagram illustrating a structural example of the constant output controller 8. The constant output controller 8 includes an amplitude calculator 81, a subtractor 82, a PI controller 83, a limiter 84, and a filter 85.

The amplitude calculator 81 calculates a voltage command amplitude value as a voltage feedback value Vfb from the d-axis voltage command Vd_ref and the q-axis voltage command Vq_ref from the current controller 3 (see FIG. 3), and outputs the result to the subtractor 82.

The subtractor 82 subtracts the voltage feedback value Vfb from a limit voltage command and outputs the subtracted result to the PI controller 83. Here, the limit voltage command corresponds to a highest voltage that can be output from the DC voltage source 80 and is determined on the basis of the detected voltage value from the voltage detector 7 (see FIG. 3). For instance, the limit voltage command may be the detected voltage value itself or may be a value obtained by multiplying the detected voltage value by a predetermined coefficient.

The PI controller 83 performs PI control in which a proportional operation and an integral operation are combined, so as to generate an output value such that the subtracted result from the subtractor 82, namely, the value obtained by subtracting the voltage feedback value Vfb from the limit voltage command becomes closer to zero, and outputs the result to the limiter 84. The limiter 84 limits the output value of the PI controller 83 so that the voltage feedback value Vfb does not exceed the limit voltage command, and outputs the result to the filter 85.

The output value of the filter 85 is output as the constant output amount Id_refc to the current command calculator 2 (see FIG. 3). In this example, the constant output amount Id_refc is calculated as a negative value and is added to the reference value Id_ref1 of the d-axis current command in the current command calculator 2. However, without being limiting thereto, it is possible to calculate the constant output amount Id_refc as a positive value and to subtract the positive constant output amount Id_refc from the reference value Id_ref1 of the d-axis current command in the current command calculator 2. Note that, it is possible to eliminate the filter 85 so that the output of the limiter 84 is used as the constant output amount Id_refc.

Specifically, without performing the field weakening control, if the voltage feedback value Vfb is smaller than the limit voltage command, the constant output amount Id_refc remains to be zero, and the field weakening control is not started. In other words, the d-axis current command Id_ref remains to be the reference value Id_ref1. When the rotation speed of the AC motor 40 increases so that the voltage feedback value Vfb exceeds the limit voltage command, the constant output amount Id_refc increases, and the field weakening control is started. In other words, the d-axis current command Id_ref decreases from the reference value Id_ref1.

Figure 8:
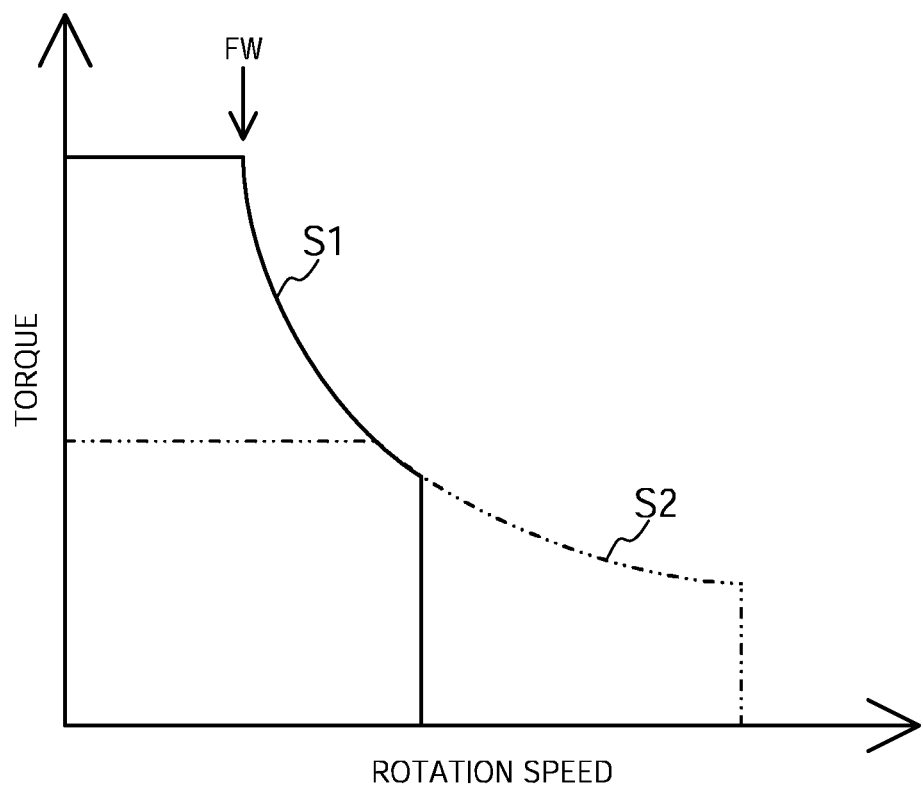
FIG. 8 is a graph for describing winding switching.

Referring to the low speed rotation state S1 in FIG. 8, the case in which the voltage feedback value Vfb is smaller than the limit voltage command without performing the field weakening control corresponds to a speed area where the rotation speed of the AC motor 40 is lower than the field weakening start point FW. In this speed area, it is possible to secure the highest torque. In contrast, in a speed area where the rotation speed of the AC motor 40 is higher than the field weakening start point FW, the torque that can be secured is gradually decreased along with an increase of the rotation speed.

Figure 9:
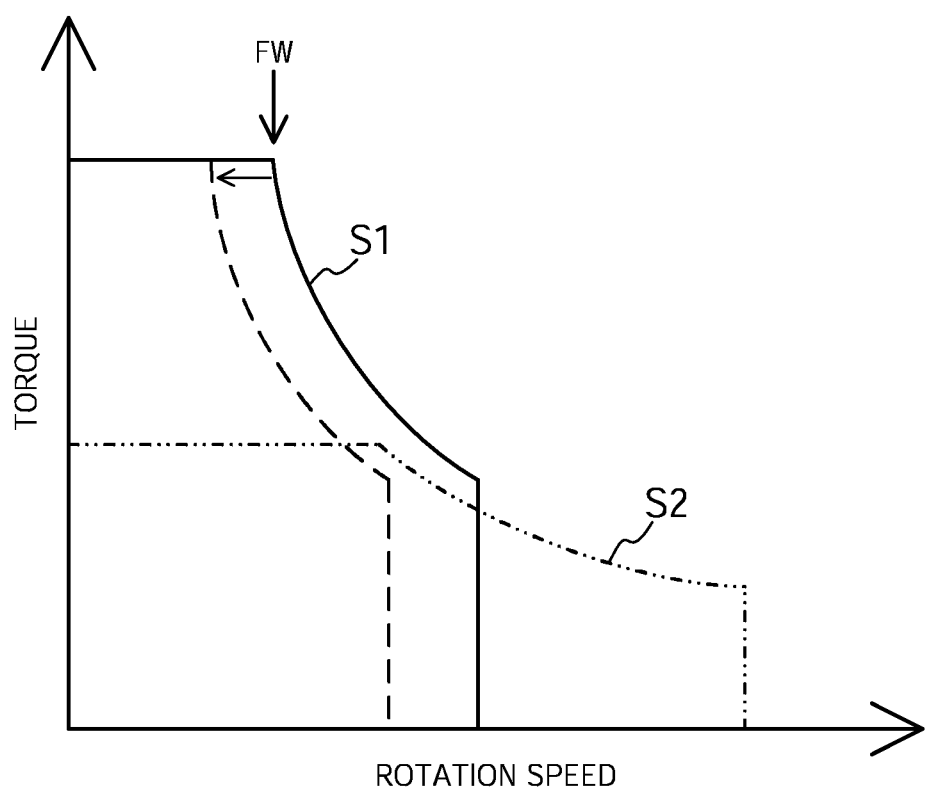
FIG. 9 is a graph for describing the winding switching.

Note that, if the output voltage of the DC voltage source 80 is lowered due to a factor such as discharge, the limit voltage command also decreases. In this case, as shown in FIG. 9, the field weakening start point FW decreases so that the speed area in which the field weakening is performed is lowered.

(Determining Method for Switching)

The winding switching signal generator 10 obtains the constant output amount Id_refc from the constant output controller 8 and obtains the q-axis current command Iq_ref and the d-axis current command Id_ref from the current command calculator 2.

Among them, the constant output amount Id_refc indicates an amount of decreasing the d-axis current command Id_ref for field weakening as described above. As an absolute value of the constant output amount Id_refc becomes larger, the d-axis current command Id_ref becomes smaller (see FIG. 7). From this fact, it can be said that the constant output amount Id_refc is information indicating the degree of the field weakening.

In addition, the inclination Iθ of the combined vector I1 from the q-axis to the d-axis in the negative direction calculated from the q-axis current command Iq_ref and the d-axis current command Id_ref corresponds to the amount of decreasing the d-axis current command Id_ref for the field weakening (namely, the absolute value of the constant output amount Id_refc) (see FIG. 7). From this fact, it can be said that the inclination Iθ of the combined vector I1 is also the information indicating the degree of the field weakening.

The winding switching signal generator 10 obtains the information indicating the degree of the field weakening. Then, if the degree of the field weakening exceeds a predetermined condition in the low speed rotation state S1, the winding switching signal generator 10 outputs a winding switching signal for switching from the low speed rotation state S1 to the high speed rotation state S2.

For instance, if the constant output amount Id_refc is a predetermined threshold value or larger in the low speed rotation state S1, the winding switching signal generator 10 outputs the winding switching signal for switching from the low speed rotation state S1 to the high speed rotation state S2.

Further, if the inclination Iθ of the combined vector I1 is a predetermined threshold value or larger in the low speed rotation state S1, the winding switching signal generator 10 may output the winding switching signal for switching from the low speed rotation state S1 to the high speed rotation state S2.

In this way, the switching from the low speed rotation state S1 to the high speed rotation state S2 is determined on the basis of the degree of the field weakening, and hence output efficiency of the AC motor 40 in the switching can be substantially the same value. If the degree of the field weakening is enhanced (namely, if the absolute value of the constant output amount Id_refc is increased), the output efficiency of the AC motor 40 is lowered. Therefore, by using not the rotation speed but the degree of field weakening for determining the switching of windings, the output efficiency of the AC motor 40 in the switching of windings can be substantially the same value, and hence it is possible to increase the region where the operation can be performed with a high efficiency state.

If the output voltage of the DC voltage source 80 is lowered due to a factor such as discharge, the speed area where the field weakening is performed is lowered as shown in FIG. 9. Therefore, if the rotation speed is used for determining the switching of windings as in the conventional technology, the output efficiency of the AC motor 40 in the switching of windings may vary more than necessary. For instance, it is considered that the rotation speed to be a threshold value for switching is defined in consideration of a value after the output voltage of the DC voltage source 80 is lowered. In this case, the speed area where the field weakening is performed is relatively increased before the output voltage of the DC voltage source 80 is lowered. Therefore, there may occur a case in which the rotation speed exceeds the threshold value so that the low speed rotation state is switched to the high speed rotation state before the output efficiency of the AC motor 40 is lowered not so much.

In contrast, in this embodiment, because the switching from the low speed rotation state S1 to the high speed rotation state S2 is determined on the basis of the degree of the field weakening, even if the output voltage of the DC voltage source 80 is high or low, the output efficiency of the AC motor 40 can be substantially the same in the switching. As a result, the rotation speed of the AC motor 40 before the output voltage of the DC voltage source 80 is lowered becomes relatively high, and the rotation speed of the AC motor 40 after the output voltage of the DC voltage source 80 is lowered becomes relatively low. Therefore, in this embodiment, the operation in the low speed rotation state can be performed until the output efficiency of the AC motor 40 is lowered to the threshold value.

Note that, in the embodiment described above, the switching is determined on the basis of the constant output amount Id_refc or the inclination Iθ of the combined vector I1 as an example. However, without being limited thereto, the following method may be adopted.

For instance, the winding switching signal generator 10 may output the winding switching signal for switching from the low speed rotation state S1 to the high speed rotation state S2 if a quotient (Id_refc/Id_ref) obtained by dividing the constant output amount Id_refc by the d-axis current command Id_ref becomes a predetermined threshold value or larger in the low speed rotation state S1.

Further, the winding switching signal generator 10 may output the winding switching signal for switching from the low speed rotation state S1 to the high speed rotation state S2 if a quotient (Id_refc/I1) obtained by dividing the constant output amount Id_refc by the size of the combined vector I1 becomes a predetermined threshold value or larger in the low speed rotation state S1.

Further, the winding switching signal generator 10 may output the winding switching signal for switching from the low speed rotation state S1 to the high speed rotation state S2 if a quotient (Id_refc/Id_ref1) obtained by dividing the constant output amount Id_refc by the reference value Id_ref1 of the d-axis current command becomes a predetermined threshold value or larger in the low speed rotation state S1.

Note that, as to the switching from the high speed rotation state S2 to the low speed rotation state S1, for example, it is possible to temporarily store the rotation speed at the time of switching from the low speed rotation state S1 to the high speed rotation state S2, and to perform the switching on the basis of the rotation speed. Alternatively, it is possible to adopt another determining method.

It should be understood by those skilled in the art that various modifications, combinations, sub-combinations and alterations may occur depending on design requirements and other factors insofar as they are within the scope of the appended claims or the equivalents thereof.

What is claimed is:

1. A motor control apparatus comprising:
    a d-axis current command value corrector configured to decrease a d-axis current command value as a command value of an exciting current component of a current flowing in an AC motor to perform field weakening;
    a field weakening information obtaining section configured to obtain a value indicating a degree of the field weakening performed by the d-axis current command value corrector; and
    a switch command generator configured to generate a switch command from a first state to a second state when the value indicating the degree of the field weakening obtained by the field weakening information obtaining section is a predetermined threshold value or larger in the first state, wherein in the first state power is supplied to a coil of a first winding number arranged in the AC motor, and wherein in the second state power is supplied to a coil of a second winding number that is smaller than the first winding number.

2. The motor control apparatus according to claim 1, wherein the value indicating the degree of the field weakening indicates a constant output amount as an amount of decreasing the d-axis current command value from a reference value determined for a case in which the field weakening is not performed; and
    the switch command generator is configured to generate the switch command when the constant output amount is a predetermined threshold value or larger in the first state.

3. The motor control apparatus according to claim 1, wherein the value indicating the degree of the field weakening indicates an inclination of a combined vector of a q-axis current command value as a command value of a torque current component of the current flowing in the AC motor and the d-axis current command value from a q-axis to a d-axis in a negative direction; and
    the switch command generator is configured to generate the switch command when the inclination is a predetermined threshold value or larger in the first state.

4. The motor control apparatus according to claim 1, wherein the value indicating the degree of the field weakening indicates a quotient obtained by dividing a constant output amount as an amount of decreasing the d-axis current command value from a reference value determined for a case in which the field weakening is not performed by the d-axis current command value; and
    the switch command generator is configured to generate the switch command when the quotient is a predetermined threshold value or larger in the first state.

5. The motor control apparatus according to claim 1, wherein the value indicating the degree of the field weakening indicates a quotient obtained by dividing a constant output amount as an amount of decreasing the d-axis current command value from a reference value determined for a case in which the field weakening is not performed by a magnitude of a combined vector of a q-axis current command value as a command value of a torque current component of the current flowing in the AC motor and the d-axis current command value; and
    the switch command generator is configured to generate the switch command when the quotient is a predetermined threshold value or larger in the first state.

6. The motor control apparatus according to claim 1, wherein the value indicating the degree of the field weakening indicates a quotient obtained by dividing a constant output amount as an amount of decreasing the d-axis current command value from a reference value determined for a case in which the field weakening is not performed by the reference value; and
    the switch command generator is configured to generate the switch command when the quotient is a predetermined threshold value or larger in the first state.

7. The motor control apparatus according to claim 1, further comprising a constant output amount calculator configured to calculate a constant output amount as an amount of decreasing the d-axis current command value from a reference value determined for a case in which the field weakening is not performed, based on a q-axis voltage command value as a command value of a torque voltage component of a voltage applied to the AC motor, a d-axis voltage command value as a command value of an exciting voltage component of the voltage, and a detected output voltage value of a power supply apparatus for supplying power to the AC motor.

8. A motor control method comprising:
    decreasing a d-axis current command value as a command value of an exciting current component of a current flowing in an AC motor to perform field weakening;
    obtaining a value indicating a degree of the field weakening performed; and
    generating a switch command from a first state to a second state when the value indicating the degree of the field weakening obtained is a predetermined threshold value or larger in the first state, wherein in the first state power is supplied to a coil of a first winding number arranged in the AC motor, and wherein in the second state power is supplied to a coil of a second winding number that is smaller than the first winding number.

9. A motor control apparatus comprising:
    a d-axis current command value correcting means for decreasing a d-axis current command value as a command value of an exciting current component of a current flowing in an AC motor to perform field weakening;
    a field weakening information obtaining means for obtaining a value indicating a degree of the field weakening performed by the d-axis current command value correcting means; and
    a switch command generating means for generating a switch command from a first state to a second state when the value indicating the degree of the field weakening obtained by the field weakening information obtaining means is a predetermined threshold value or larger in the first state, wherein in the first state power is supplied to a coil of a first winding number arranged in the AC motor, and wherein in the second state power is supplied to a coil of a second winding number that is smaller than the first winding number.

10. The motor control apparatus according to claim 9, wherein the value indicating the degree of the field weakening indicates a constant output amount as an amount of decreasing the d-axis current command value from a reference value determined for a case in which the field weakening is not performed; and the switch command generating means generates the switch command when the constant output amount is a predetermined threshold value or larger in the first state.

11. The motor control apparatus according to claim 9, wherein the value indicating the degree of the field weakening indicates an inclination of a combined vector of a q-axis current command value as a command value of a torque current component of the current flowing in the AC motor and the d-axis current command value from a q-axis to a d-axis in a negative direction; and the switch command generating means generates the switch command when the inclination is a predetermined threshold value or larger in the first state.

12. The motor control apparatus according to claim 9, wherein the value indicating the degree of the field weakening indicates a quotient obtained by dividing a constant output amount as an amount of decreasing the d-axis current command value from a reference value determined for a case in which the field weakening is not performed by the d-axis current command value; and the switch command generating means generates the switch command when the quotient is a predetermined threshold value or larger in the first state.

13. The motor control apparatus according to claim 9, wherein the value indicating the degree of the field weakening indicates a quotient obtained by dividing a constant output amount as an amount of decreasing the d-axis current command value from a reference value determined for a case in which the field weakening is not performed by a magnitude of a combined vector of a q-axis current command value as a command value of a torque current component of the current flowing in the AC motor and the d-axis current command value; and the switch command generating means generates the switch command when the quotient is a predetermined threshold value or larger in the first state.

14. The motor control apparatus according to claim 9, wherein the value indicating the degree of the field weakening indicates a quotient obtained by dividing a constant output amount as an amount of decreasing the d-axis current command value from a reference value determined for a case in which the field weakening is not performed by the reference value; and the switch command generating means generates the switch command when the quotient is a predetermined threshold value or larger in the first state.

15. The motor control apparatus according to claim 9, further comprising a constant output amount calculating means for calculating a constant output amount as an amount of decreasing the d-axis current command value from a reference value determined for a case in which the field weakening is not performed, based on a q-axis voltage command value as a command value of a torque voltage component of a voltage applied to the AC motor, a d-axis voltage command value as a command value of an exciting voltage component of the voltage, and a detected output voltage value of a power supply apparatus for supplying power to the AC motor.

* * * * *